No. 841,785. PATENTED JAN. 22, 1907.
G. A. KAHL.
HARVESTER.
APPLICATION FILED MAY 1, 1906.
2 SHEETS—SHEET 1.
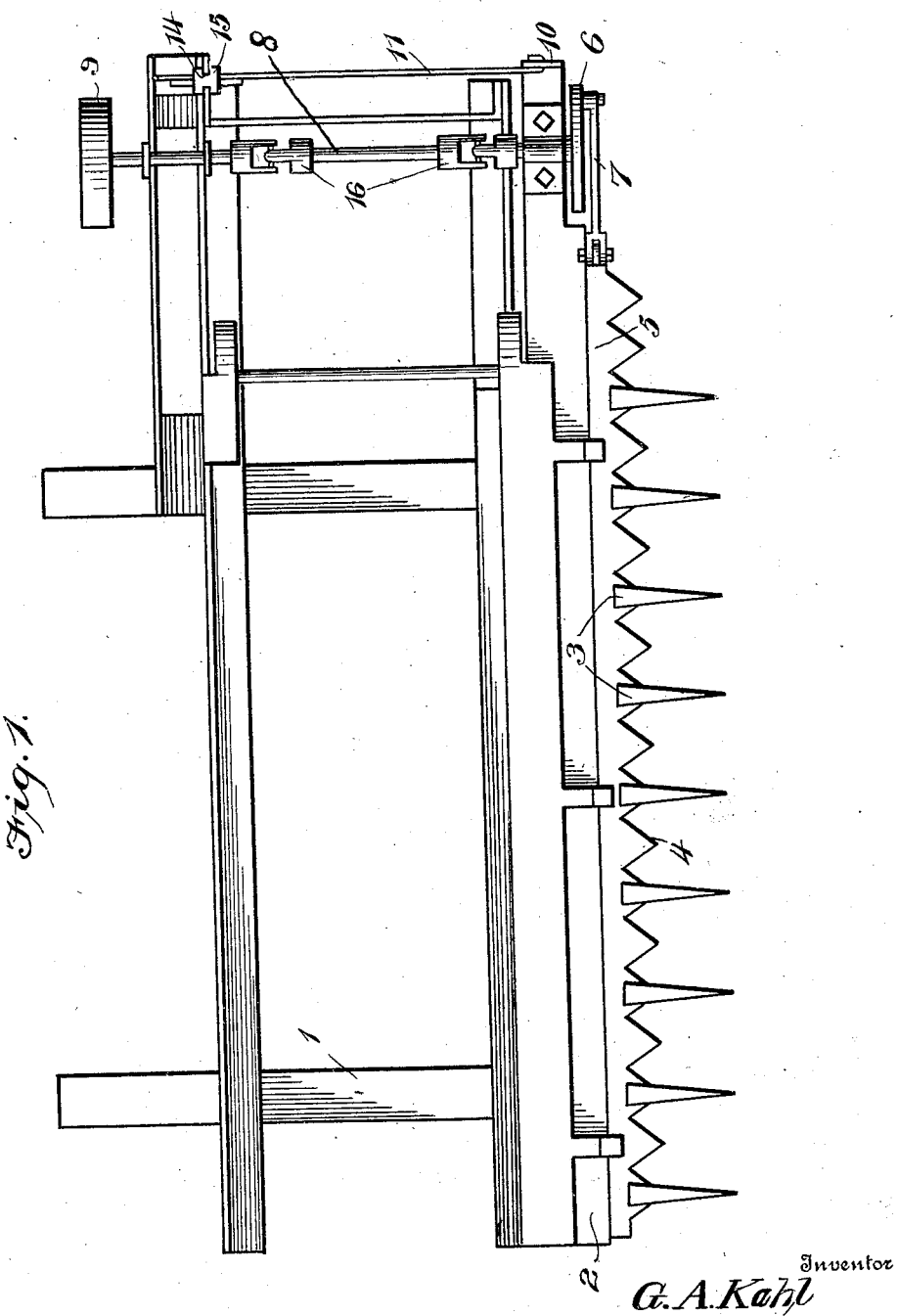

No. 841,785.
PATENTED JAN. 22, 1907.
G. A. KAHL.
HARVESTER.
APPLICATION FILED MAY 1, 1906.
2 SHEETS—SHEET 2.
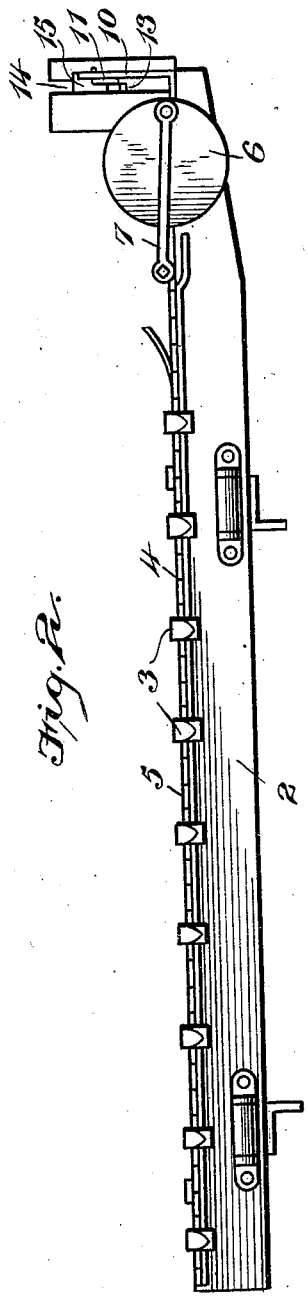
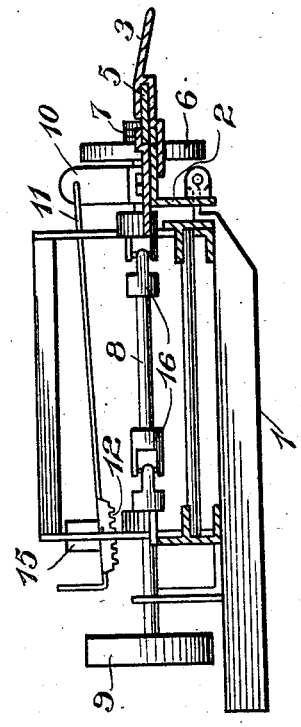
Witnesses
T. P. Britt
K. G. Whitcomb
Inventor
G. A. Kahl
By Swift & Co.
Attorneys

UNITED STATES PATENT OFFICE.

GEORGE ADAM KAHL, OF PLAINSBERG, CALIFORNIA.

HARVESTER.

No. 841,785.

Specification of Letters Patent.

Patented Jan. 22, 1907.

Application filed May 1, 1906. Serial No. 314,725.

*To all whom it may concern:*

Be it known that I, GEORGE ADAM KAHL, a citizen of the United States, residing at Plainsberg, in the county of Merced and State of California, have invented certain new and useful Improvements in Harvesters, of which the following is a specification, reference being had therein to the accompanying drawings.

The invention relates to improvements in harvesters, reapers, and the like, and has for its object to provide a device of this character having fingers and cutter-bars adapted to be tilted and set at various inclinations for the purpose of cutting at various points above the ground.

With these and other objects in view the invention consists in the construction and novel arrangement of parts hereinafter described and shown, and particularly pointed out in the appended claim.

In the drawings forming part of this specification, and in which like numerals of reference designate corresponding parts, Figure 1 is a perspective view of a cutter-bar for harvesters constructed in accordance with my invention. Fig. 2 is a front elevation thereof. Fig. 3 is a transverse sectional view.

Referring to the drawings, 1 designates the frame for supporting the cutting mechanism of a harvester of the usual construction. Hingedly mounted upon the front side of the frame 1 is an L-shaped horizontal finger-bar 2, having fingers 3, which engage the knives 4 of a reciprocating cutter-bar 5. The cutter-bar 5 is actuated by a crank-wheel 6, having a pitman 7 connected with said cutter-bar. The crank-wheel 6 is rotated by a shaft 8, having a pulley 9, which receives its operating power from the harvester proper. One end of the finger-bar is provided with an upwardly-projecting arm 10, to which is pivotally connected a bar 11, having teeth 12, which engage a horizontal member 13 of the frame 1. The loose or free end of the bar 11 operates in a slot 14, which affords a ready adjustment of the tiltable finger-bar 2. In order to hold the teeth of the bar 11 in engagement with the member 13, a weight 15 is provided, which is rigidly connected with said bar. The shaft 8 is provided with two universal joints 16.

What I claim is—

In a harvesting-machine, a frame, a finger-bar L-shaped in section hingedly connected therewith and having an upstanding arm, a shaft supported in bearings upon the frame and the finger-bar and including a plurality of universal joints, means for driving said shaft, a reciprocatory cutter-bar supported upon the finger-bar, a crank-wheel upon the shaft, a pitman connecting the crank-wheel with the cutter-bar, a toothed bar connected pivotally with the upstanding arm of the finger-bar and having a weight near the free end thereof, and a slotted member upon the main frame guiding the weighted end of the toothed bar and engaged by the teeth of the latter.

In testimony whereof I hereunto affix my signature in presence of two witnesses.

GEORGE ADAM KAHL.

Witnesses:
    A. C. CORWIN,
    ALBERT PITZER, Jr.